Aug. 19, 1930.   H. KAYANO   1,773,682
AUTOMOBILE SIGNAL
Filed April 26, 1928   2 Sheets-Sheet 1
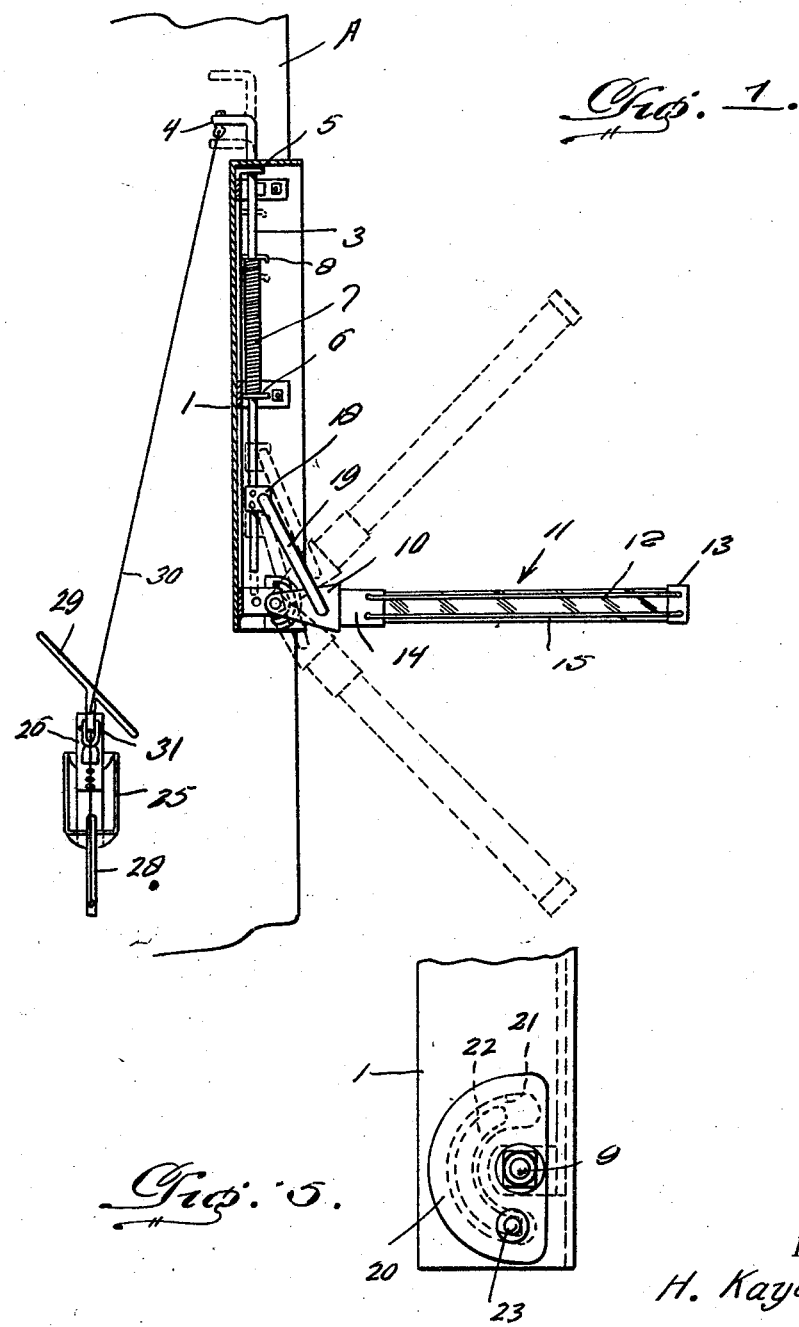
Inventor
H. Kayano,
By Clarence A. O'Brien
Attorney

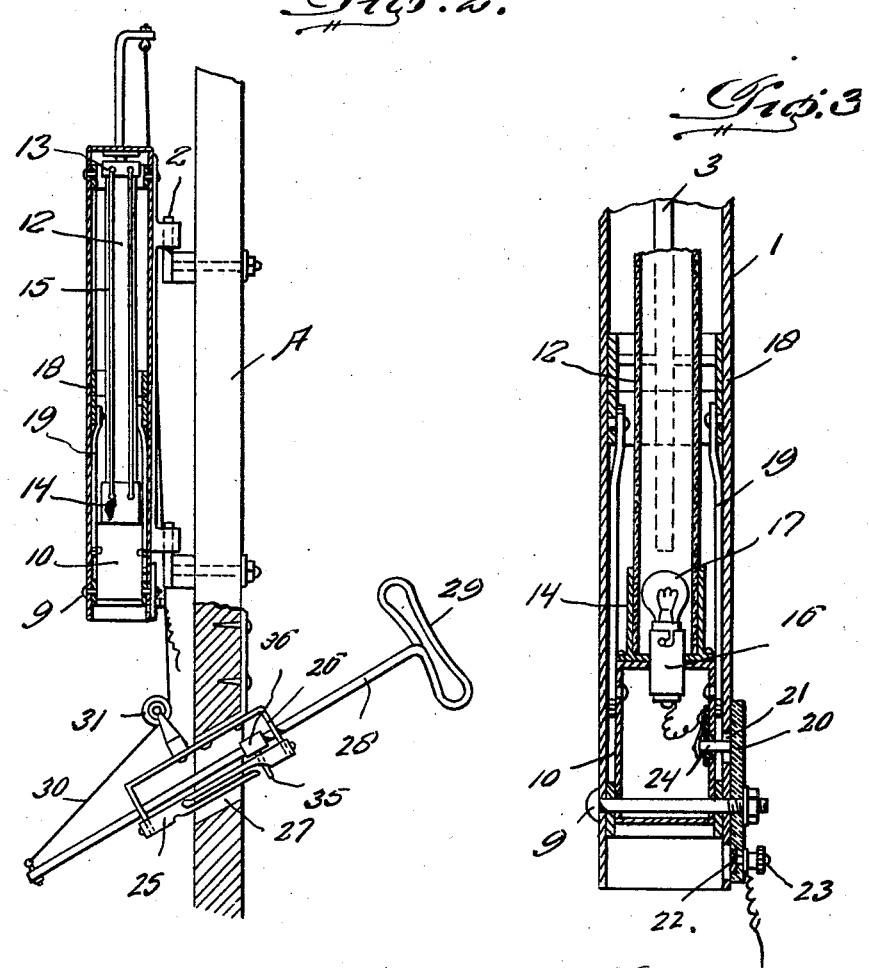

Patented Aug. 19, 1930

1,773,682

UNITED STATES PATENT OFFICE.

HIDEGI KAYANO, OF BAKER, OREGON

AUTOMOBILE SIGNAL

Application filed April 26, 1928. Serial No. 272,963.

The present invention relates to improvements in automobile signals and has for its principal object to provide a simple and efficient device for attachment on the side of the body of an automobile, which includes a laterally swinging arm for signalling, that is controlled by the driver of the vehicle, for the purpose of warning pursuing and approaching drivers and pedestrians of the intention of the driver of the vehicle upon which the signal is mounted when a turn in either direction is to be made, or when the vehicle is to be brought to a stop.

Another important object of the invention is to provide an automobile signal of the above mentioned character, wherein the signalling arm is normally concealed within a housing, so that the same is out of view, means being provided whereby said signalling arms can be readily and easily seen at night.

A further object is to provide an automobile signal of the above mentioned character, which will obviate the necessity of the driver having to place his hands out of the side of the car, when about to make a left or right hand turn, or when the vehicle is to be brought to a stop.

Still a further object is to provide an automobile signal of the above mentioned character, which is simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application, and wherein like reference characters designate like parts throughout the several views:

Figure 1 is a vertical sectional view, through the housing showing the signalling arms swung outwardly to an operative position.

Figure 2 is a view partly in elevation and partly in section of the automobile signal embodying my invention, showing the same secured on the side of the body of an automobile, the signalling arm being disposed in its normal inoperative position within the housing.

Figure 3 is an enlarged sectional view through the lower portion of the housing and the signalling arm for more clearly disclosing the circuit making and breaking mechanism.

Figure 4 is a detail view of the actuating mechanism for the signalling arm, and Figure 5 is a fragmentary side elevation of the housing to illustrate the contact and the support therefor.

In the drawings, wherein for the purpose of illustration is shown the preferred embodiment of my invention, the numeral 1 designates a substantially rectangular shaped housing or casing that is open at its outer side as well as at its lower end. The housing is secured to the side of the body A of an automobile, by the brackets shown at 2 in Figure 2. The housing is preferably mounted on the body of the vehicle to the left of the windshield frame. Adapted for vertical slidable movement in the casing or housing 1 is the rod 3, the upper end thereof projecting through the top of the housing and being formed at its upper extremity with the laterally disposed portion 4, as clearly illustrated in Figures 1 and 2. This rod is guided through suitable brackets 5 and 6 respectively and for the purpose of normally urging the rod upwardly, there is provided the expansible coil spring 7 which encircles the intermediate portion of the rod and is disposed between the brackets 6 and 8 that extend transversely of the rod as is shown in Figure 1. The purpose of this rod will be presently described in detail. A pivot forming bolt 9 extends transversely through the sides of the housing adjacent its lower end and secured on this bolt for swinging movement within the housing is the signalling arm carrying unit 10.

The signalling arm is designated generally by the numeral 11 and the same includes an elongated transparent tubular member that is formed either of glass or celluloid and is designated by the numeral 12. The tubular member is closed at its respective ends by means of the metallic caps 13 and 14 respectively, and connecting rods 15 extend between these caps around the glass tube 12, as clearly shown in the drawings. The lowermost cap 14 is fixedly secured to the unit 10 in any appropriate manner.

An electric lamp socket 16 extends into the lower end of the glass tube 12 and an electric lamp 17 is secured in the upper end of the socket for illuminating the signalling arm, as will also be presently described. A substantially U-shaped collar 18 is fixedly secured on the lower end portion of the elongated rod 3 for vertical movement therewith and a pair of links 19 afford an operative connection between the respective sides of the U-shaped collar and the adjacent sides of the unit 10, whereby the signalling arm 11 will be caused to operate simultaneously with the vertical movement of the rod 3.

An insulated arcuate shaped strip of material 20 is secured on one side of the lower end portion of the housing 1 and this side of the housing is formed with an arcuate slot 21.

An arcuate contact strip 22 is arranged in the inner face of the insulated base 20, for communication with the arcuate slot 21, as clearly shown in the dotted lines in Figure 5, and a terminal 23 is connected with this contact strip 22, for connecting a wire that leads to the battery terminal. A contact pin 24 is carried by the movable unit 10 of the signalling arm 11 and is insulated therefrom in any appropriate manner, and one end of this contact pin operates in the arcuate slot 21 and has wiping engagement with the inner face of the base 20 and also with the contact strip 22 at certain intervals. This contact pin 24 is connected to the electric lamp socket, as clearly shown in Figure 3. The insulated base is secured on the side of the housing by means of the bolt 9 that forms the pivot for the lower end of the signalling arm.

The actuating means for the rod 3 that effects the outward swinging movement of the signalling arm to an indicating position will now be specifically described. A semi-cylindrical strip 25 is attached at its ends to a supporting bracket 26 that is secured within a suitable opening 27 provided therefor in the side A of the body of the vehicle below the housing 1, and slidable through the ends of the bracket and also adapted for rotation therein is the elongated shaft 28. The handle 29 is formed on the inner end of the shaft, while the outer end of the shaft has attached thereto a cable or chain 30.

The cable 30 is trained over a suitable pulley 31 supported on the bracket 26 and the other end of the flexible element is secured to the laterally extending upper end portion 4 of the rod 3.

The semi-cylindrical strip 25 is formed with the spaced longitudinally extending slots 32, 33 and 34 respectively, all of the slots communicating at one end while the opposite ends of the slots are formed with enlarged recesses, as clearly shown in Figure 4. As further shown in this particular figure, the slot 32 is the shortest, while the intermediate slot 33 is the longest. Cooperating with these slots is the pin 35 that extends laterally from a collar 36 secured on the intermediate portion of the shaft 28.

Normally, the spring 7 holds the rod 3 in a raised position and consequently the signalling arm 11 will be disposed vertically, and concealed within the housing 1 and when in this position, the contact pin 24 is out of engagement with the contact strip 22.

By actuating the handle 29, so that the pin 35 will enter the short slot 32, a downward pull will be exerted on the cable 30 to move the rod 3 downwardly and simultaneously cause the signalling arm 11 to swing outwardly on its pivot 9 to an angle of approximately 45° thus indicating that a turn in one direction is to be made, and when the pin is in the recess at the end of the slot 32, the shaft is in a locked position against displacement.

As soon as the signalling arm moves to its initial indicating position, the contact pin 24 will be in engagement with the contact strip 22, thus closing the circuit to the lamp 17 to illuminate the signalling arm.

Manifestly, by actuating the shaft to move the pin 25 in the next longer slot 34, the signalling arm will be swung still further downwardly to a horizontal position to designate that a stop is about to be made, and when the pin 35 is moved along in the longest slot 33, the signalling arm is moved still further downwardly to the position shown in the dotted lines in Figure 1, to designate that a turn in the other direction is to be made, and during the swinging movement of the signalling arm from its first indicating position to the last indicating position, the contacts pin 24 will be in engagement with the contact strip 22 to close the circuit to the lamp, in the transparent tube of the signalling arm.

As soon as the pin is disengaged from the notched ends of the slot, the spring 7 will return the rod and the signalling arm to their normal position, as is readily obvious from the construction shown.

From the foregoing description it will be seen that I have provided an automobile signal that can be readily and easily attached on a motor vehicle due to its simplicity, and the same can be easily operated by the driver of the vehicle to give the proper signal to approaching and pursuing drivers and pedestrians.

Furthermore, an automobile signal of the above mentioned character can be constructed at a very low cost and yet be strong and durable.

While I have shown the preferred embodiment of my invention, it is to be understood that various changes in the size, shape and arrangement of parts may be resorted to, without departing from the spirit of the invention or the scope of the appended claim.

Having thus described my invention, what I claim as new is:

In combination, a casing open at its outer longitudinal side, a signalling arm pivotally secured at one end in the casing and carrying an electric signalling lamp, an insulated base secured on the outside of the casing, the portion of the casing adjacent the insulated base being formed with an arcuate slot, a contact strip arranged on the inner face of the insulated base for registration with the arcuate slot, a terminal associated with the contact strip, a contact pin carried by the pivoted end of the signalling arm and insulated therefrom, said pin being electrically connected to the signalling lamp, the pin being operable in said slot and adapted to have wiping engagement with the contact strip when the signalling arm is swung outwardly of the casing to an indicating position.

In testimony whereof I affix my signature.

HIDEGI KAYANO.